United States Patent
Hundal et al.

(10) Patent No.: US 10,552,355 B2
(45) Date of Patent: Feb. 4, 2020

(54) METHODS AND DEVICES FOR EXTENDING USB 3.0-COMPLIANT COMMUNICATION OVER AN EXTENSION MEDIUM

(71) Applicant: Icron Technologies Corporation, Burnaby (CA)

(72) Inventors: Sukhdeep Singh Hundal, Surrey (CA); Mohsen Nahvi, Vancouver (CA); Remco van Steeden, Vancouver (CA)

(73) Assignee: Icron Technologies Corporation, Burnaby (CA)

(*) Notice: Subject to any disclaimer, the term of this patent is extended or adjusted under 35 U.S.C. 154(b) by 179 days.

(21) Appl. No.: 15/724,030

(22) Filed: Oct. 3, 2017

(65) Prior Publication Data
US 2019/0102333 A1    Apr. 4, 2019

(51) Int. Cl.
*G06F 3/00* (2006.01)
*G06F 13/38* (2006.01)
*G06F 13/16* (2006.01)
*G06F 13/42* (2006.01)
*G06F 9/4401* (2018.01)

(52) U.S. Cl.
CPC .......... *G06F 13/385* (2013.01); *G06F 9/4411* (2013.01); *G06F 13/1642* (2013.01); *G06F 13/1673* (2013.01); *G06F 13/4282* (2013.01); *G06F 2213/0042* (2013.01); *G06F 2213/4002* (2013.01)

(58) Field of Classification Search
CPC ................... G06F 13/00; G06F 3/0629; G06F 3/0631–3/0638; G06F 3/0646–3/0655
USPC ........................................ 710/10–21, 100, 25
See application file for complete search history.

(56) References Cited

U.S. PATENT DOCUMENTS 6,603,744 B2    8/2003  Mizutani
7,073,010 B2 *  7/2006  Chen ..................... G06F 13/385
                                                        710/313

(Continued)

FOREIGN PATENT DOCUMENTS

JP          2000-332791 A     11/2000

OTHER PUBLICATIONS

Anderson, D., "Introduction to USB 3.0," MindShare, Inc., n.d., <http://www.mindshare.com> [retrieved Sep. 30, 2010], 20 pages.

(Continued)

*Primary Examiner* — Tim T Vo
*Assistant Examiner* — Kim T Huynh
(74) *Attorney, Agent, or Firm* — Christensen O'Connor Johnson Kindness PLLC

(57) ABSTRACT

An upstream facing port device (UFP device) and a downstream facing port device (DFP device) allow a host device and a USB device to conduct SuperSpeed communication via a non-USB compliant extension medium. In some embodiments, the UFP device helps overcome increased latency by generating synthetic packets to be transmitted to the DFP device in order to pre-fetch more data packets from the USB device than requested by the host device. In some embodiments, the DFP device adjusts service interval timing or caches data packets from the host device in order to compensate for the increased latency. In some embodiments, the DFP device transmits a synthetic acknowledgement packet to the UFP device to indicate a larger amount of free buffer space than is present on the USB device to help overcome the increased latency.

14 Claims, 12 Drawing Sheets

(56) References Cited

U.S. PATENT DOCUMENTS

| | | |
|---|---|---|
| 7,149,833 B2 | 12/2006 | McLeod |
| 7,587,536 B2 | 9/2009 | McLeod |
| 10,150,673 B2 * | 12/2018 | Hundal .................. C01B 32/05 |
| 2002/0010821 A1 | 1/2002 | Yu et al. |
| 2002/0144042 A1 | 10/2002 | Garney |
| 2004/0177197 A1 * | 9/2004 | McLeod ............. G06F 13/4045 |
| | | 710/300 |
| 2004/0205276 A1 | 10/2004 | Ferguson |
| 2005/0027889 A1 | 2/2005 | Sandulescu |
| 2005/0033877 A1 | 2/2005 | McLeod |
| 2005/0071733 A1 | 3/2005 | Fukae et al. |
| 2005/0278472 A1 | 12/2005 | Gierke |
| 2006/0020736 A1 * | 1/2006 | Jackson ............... G06F 13/385 |
| | | 710/313 |
| 2006/0123166 A1 | 6/2006 | Toebes et al. |
| 2006/0149863 A1 | 7/2006 | Engler |
| 2007/0239900 A1 | 10/2007 | Beasley et al. |
| 2008/0071962 A1 * | 3/2008 | Yang ..................... G06F 9/4411 |
| | | 710/313 |
| 2008/0162741 A1 | 7/2008 | Christison et al. |
| 2010/0042767 A1 | 2/2010 | McLeod |
| 2011/0064023 A1 | 3/2011 | Yamamoto et al. |
| 2011/0243035 A1 | 10/2011 | Hall |
| 2013/0067128 A1 | 3/2013 | Sosniak |
| 2013/0275629 A1 | 10/2013 | Hall |
| 2014/0122752 A1 * | 5/2014 | Toivanen ................ H04L 69/22 |
| | | 710/63 |
| 2015/0269102 A1 * | 9/2015 | Inha ...................... G06F 13/385 |
| | | 710/14 |
| 2016/0125838 A1 * | 5/2016 | Hundal .................. G09G 5/006 |
| | | 345/520 |

OTHER PUBLICATIONS

Chuah, A. (publisher), "MindShare Intro to USB 3.0[1]," MindShare, Inc., Sep. 30, 2010, <http://www.scribd.com/doc/38442817/MindShare-Intro-to-USB-3-0-1#scribd>, 1 page.

"Universal Serial Bus 3.0 Specification (Including Errata and ECNs Through May 1, 2011)," Revision 1.0, Jun. 6, 2011, 531 pages.

* cited by examiner

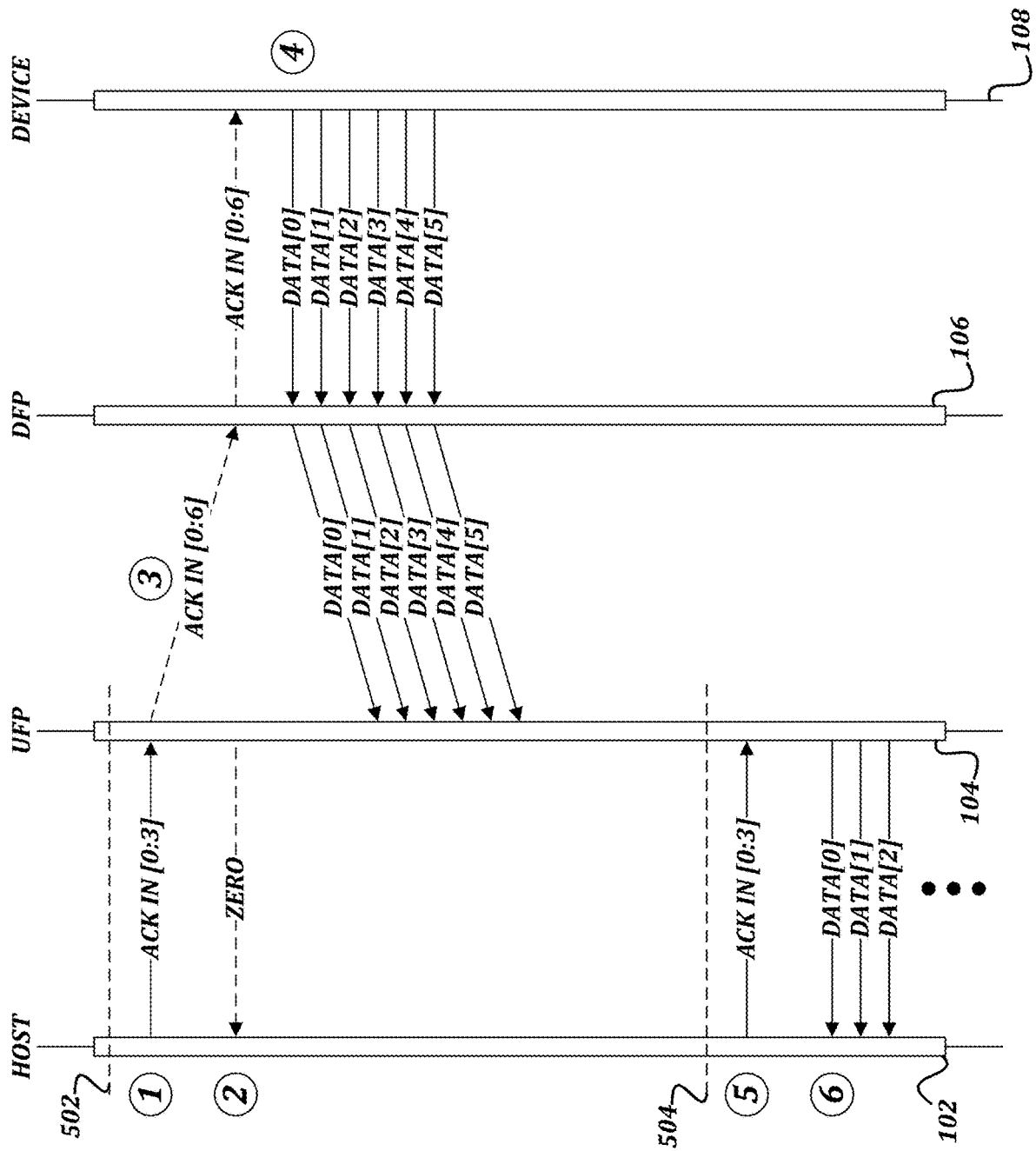

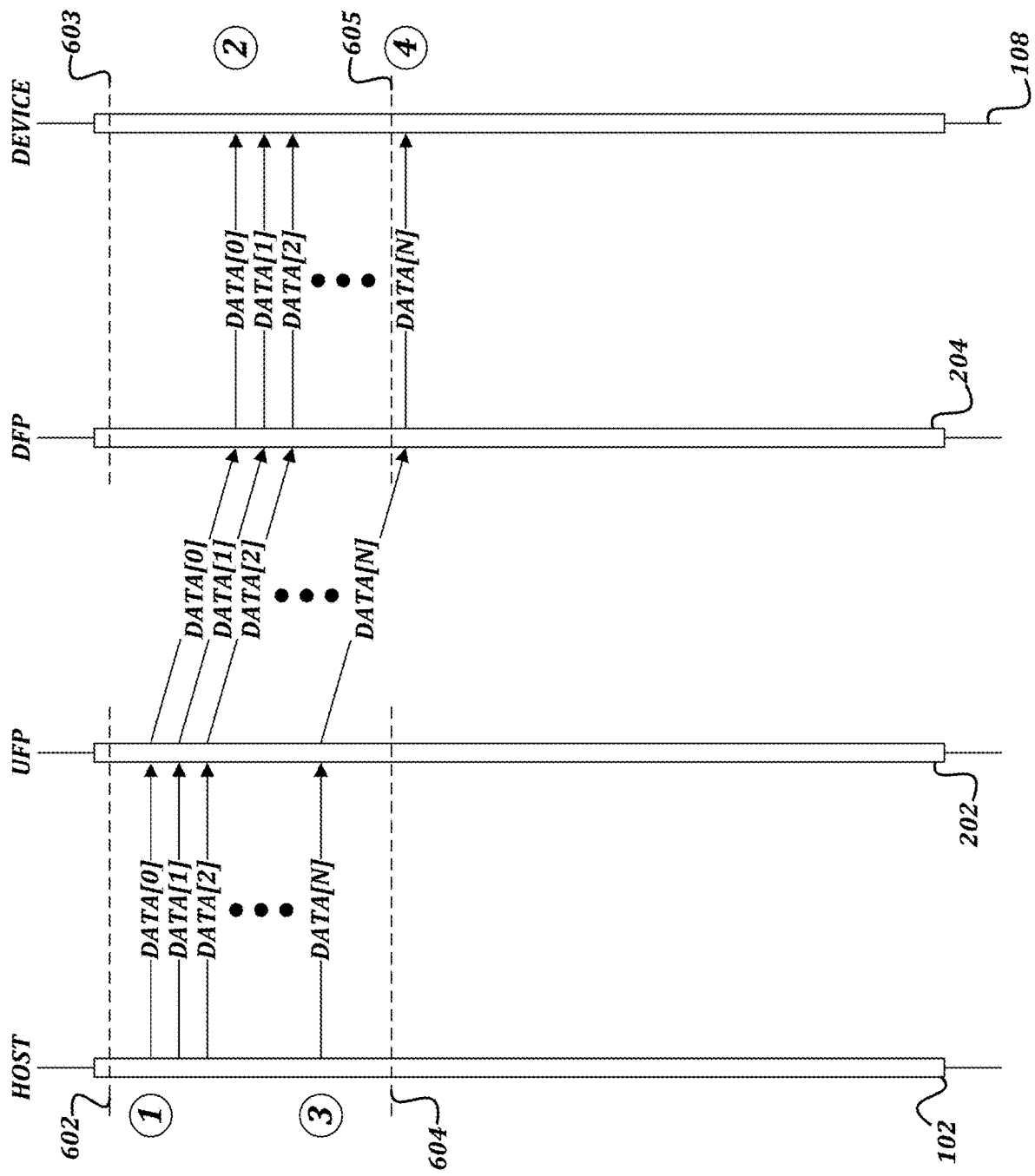

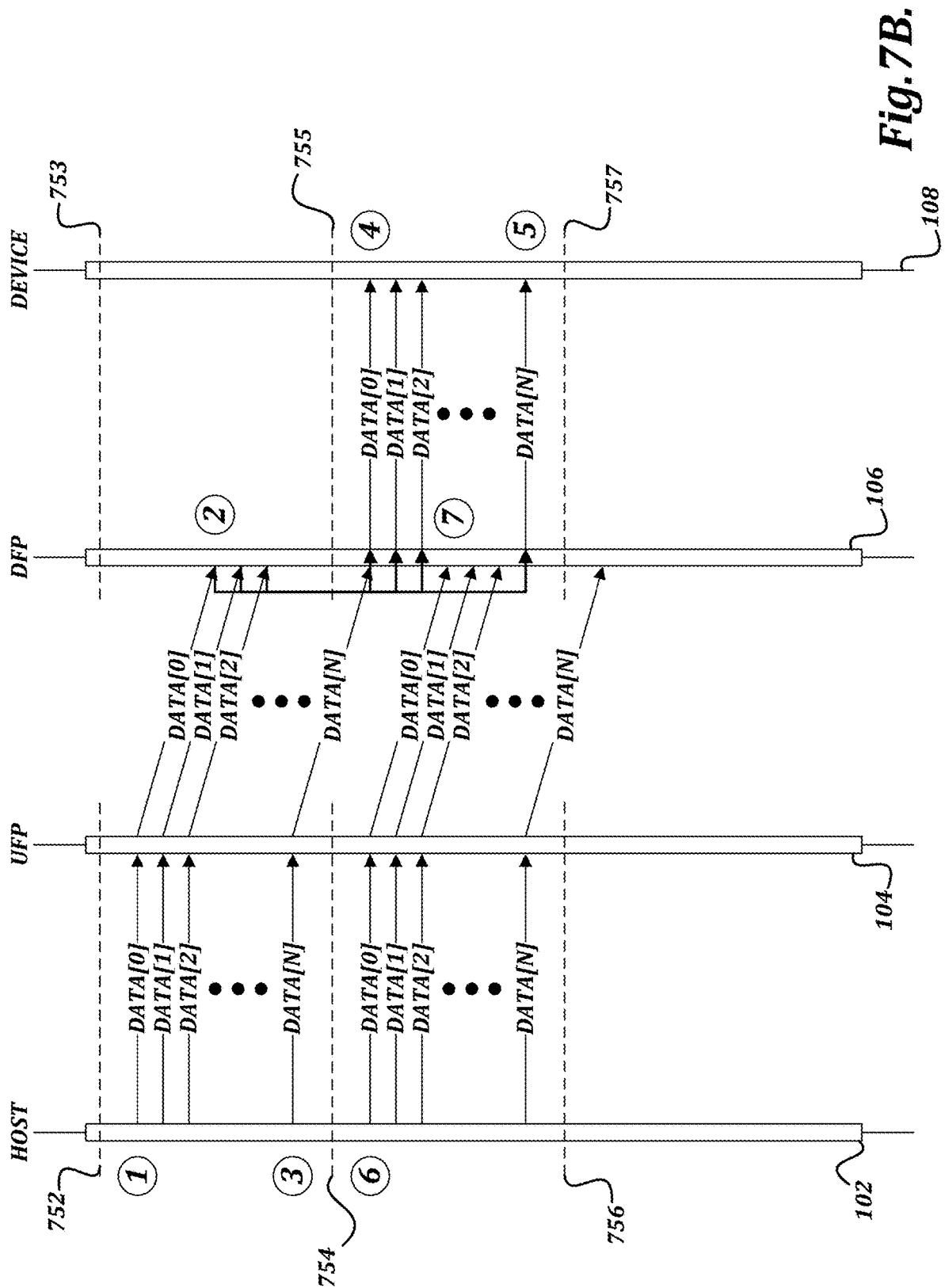

METHODS AND DEVICES FOR EXTENDING USB 3.0-COMPLIANT COMMUNICATION OVER AN EXTENSION MEDIUM

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008; released as Universal Serial Bus 3.1 Specification Revision 1.0 in July 2013; released as Universal Serial Bus 3.2 Specification Revision 1.0 on Sep. 22, 2017, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.1 of the USB Specifications, SuperSpeed connections are provided that use a 5 Gbps (Gen 1) or 10 Gbps (Gen 2) signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, a new method and apparatus are needed to optionally allow for extension of a SuperSpeed USB device to a greater distance from the host to which it is coupled, such that SuperSpeed USB packets may be propagated between the host and the USB device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an upstream facing port device (UFP device) is provided. The UFP device comprises a USB upstream facing port and an extension interface configured to be coupled to a non-USB extension medium. The UFP device is configured to allow a host device coupled to the USB upstream facing port via a USB-compliant connection to communicate via the extension medium with a USB device coupled to a downstream facing port device (DFP device). The UFP device is configured to perform actions comprising receiving a request packet from the host device via the USB upstream facing port, wherein the request packet includes a sequence number and a buffer count, and wherein the sequence number and the buffer count identify a first set of requested data packets; generating a synthetic request packet, wherein the synthetic request packet includes the sequence number of the request packet and a synthetic buffer count, and wherein the sequence number and the synthetic buffer count identify a second set of requested data packets that includes the first set of requested data packets and additional data packets; transmitting the synthetic request packet to the DFP device via the extension medium; transmitting a synthetic response packet to the host device to cause the host device to wait for the first set of requested data packets; receiving data packets from the DFP device; and storing the received data packets until requested by the host device.

In some embodiments, a method of enabling communication between a host device and a USB device via a non-USB extension medium is provided. A UFP device receives a request packet from the host device via a USB upstream facing port of the UFP device, wherein the request packet includes a sequence number and a buffer count, and wherein the sequence number and the buffer count identify a first set of requested data packets. The UFP device generates a synthetic request packet, wherein the synthetic request packet includes the sequence number of the request packet and a synthetic buffer count, and wherein the sequence number and the synthetic buffer count identify a second set of requested data packets that includes the first set of requested data packets and additional data packets. The UFP device transmits the synthetic request packet to a downstream facing port device (DFP device) via the extension medium. The UFP device transmits a synthetic response packet to the host device to cause the host device to wait for the first set of requested data packets. The UFP device receives data packets from the DFP device, and the UFP device stores the received data packets until requested by the host device.

In some embodiments, a downstream facing port device (DFP device) is provided. The DFP device comprises a USB downstream facing port and an extension interface configured to be coupled to a non-USB extension medium. The DFP device is configured to allow a USB device coupled to the USB downstream facing port via a USB-compliant connection to communicate via the extension medium with a host device coupled to a UFP device, by performing actions comprising: generating service interval boundaries at a first timing that is offset from a second timing of service interval boundaries generated by the host device; receiving a set of data packets from the UFP device that were generated by the host device during a first service interval; and transmitting the set of data packets to the USB device during a second service interval that corresponds to the first service interval.

In some embodiments, a method of enabling communication between a host device and a USB device via a non-USB extension medium is provided. A DFP device coupled to the USB device via a USB-compliant connection generates service interval boundaries at a first timing that is offset from a second timing of service interval boundaries generated by the host device. The DFP device receives a set of data packets from a UFP device via the extension medium that were generated by the host device during a first service interval. The DFP device transmits the set of data packets to the USB device during a second service interval that corresponds to the first service interval.

In some embodiments, a DFP device is provided. The DFP device comprises a USB downstream facing port and an extension interface configured to be coupled to a non-USB extension medium. The DFP device is configured to allow a USB device coupled to the USB downstream facing port via a USB-compliant connection to communicate via the extension medium with a host device coupled to a UFP device, by performing actions comprising: generating service interval boundaries that are synchronized with service interval boundaries generated by the host device; receiving a set of data packets from the UFP device that were generated by the host device during a first service interval; storing the set of data packets; and transmitting the set of data packets to the USB device in a second service interval that occurs after the first service interval.

In some embodiments, a method of enabling communication between a host device and a USB device via a non-USB extension medium is provided. A DFP device coupled to the USB device via a USB-compliant connection generates service interval boundaries that are synchronized with service interval boundaries generated by the host device. The DFP device receives a set of data packets from a UFP device via the extension medium that were generated by the host device during a first service interval. The DFP device stores the set of data packets, and transmits the set of data packets to the USB device in a second service interval that occurs after the first service interval.

In some embodiments, a DFP device is provided. The DFP device comprises a USB downstream facing port and an extension interface configured to be coupled to a non-USB extension medium. The DFP device is configured to allow a USB device coupled to the USB downstream facing port via a USB-compliant connection to communicate via the extension medium with a host device coupled to a UFP device by performing actions comprising: receiving a data packet from the UFP device that was generated by the host device; transmitting the data packet to the USB device; receiving an acknowledgement packet from the USB device, wherein the acknowledgement packet includes a first buffer size indicating an available buffer space on the USB device; and transmitting a synthetic acknowledgement packet to the UFP device, wherein the synthetic acknowledgement packet includes a second buffer size indicating an available buffer space on the DFP device that is different from the first buffer size.

In some embodiments, a method of enabling communication between a host device and a USB device via a non-USB extension medium is provided. A DFP device coupled to the USB device via a USB-compliant connection receives a data packet from a UFP device via the extension medium that was generated by the host device. The DFP device transmits the data packet to the USB device. The DFP device receives an acknowledgement packet from the USB device, wherein the acknowledgement packet includes a first buffer size indicating an available buffer space on the USB device. The DFP device transmits a synthetic acknowledgement packet to the UFP device, wherein the synthetic acknowledgement packet includes a second buffer size indicating an available buffer space on the DFP device that is different from the first buffer size.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5B is a sequence diagram that illustrates an example of a second technique for compensating for latency added by the extension medium in isochronous IN transactions according to various aspects of the present disclosure;

FIG. 6B is a sequence diagram that illustrates a problem in using the naïve bridging technique for isochronous OUT transactions in high latency situations;

FIG. 7B is a sequence diagram that illustrates an example of a second technique for compensating for latency added by the extension medium in isochronous OUT transactions according to various aspects of the present disclosure;

DETAILED DESCRIPTION

Figure 1:
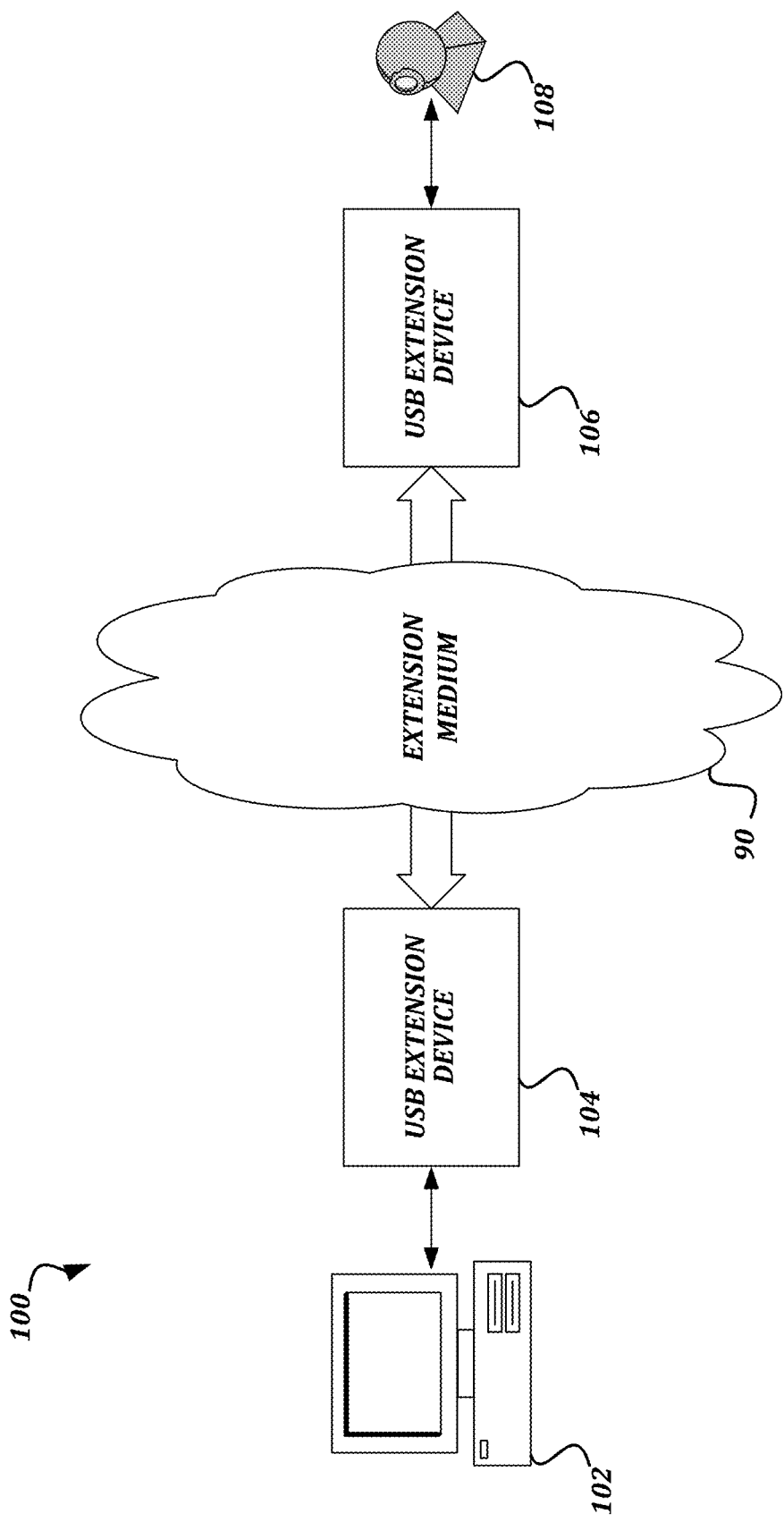
FIG. 1 is a block diagram that illustrates one embodiment of a system 100 for extending USB communication according to various embodiments of the present disclosure.

FIG. 1 is a block diagram that illustrates one embodiment of a system 100 for extending USB communication according to various embodiments of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 1.0, USB 1.1, USB 2.0, USB 3.0, or USB 3.1. As discussed above, such a connection would be limited to a short distance between the host device 102 and the USB device 108 due to the timing requirements of the USB specification.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via an extension medium 90 such as a network that may increase the distance between the host device 102 and the USB device 108 beyond that supported by the USB specification. The extension medium 90 and communication thereon may include any suitable networking technology, such as Ethernet, Bluetooth, WiFi, WiMax, the Internet, fiber optic point-to-point transmission, and/or the like, and any suitable communication medium, such as via physical cables, via fiber optic cable, via wireless spectrum, and/or the like.

In some embodiments, the upstream USB extension device 104 and the downstream USB extension device 106 may happen to be closer to each other than the short USB requirement distance, and/or may be directly connected by a cable instead of via a network, but retain the capability of overcoming increased latency between the host device 102 and the USB device 108 that is introduced by the use of an extension medium that does not comply with the USB specifications.

One feature provided by the USB extension devices 104, 106 is that they hide the presence of the extension medium from the host device 102 and the USB device 108. In other words, the USB extension devices 104, 106 handle communication over the extension medium and compensate for any additional latency introduced thereby, but the host device 102 and the USB device 108 behave as if they were connected directly via a USB specification-compliant connection. Accordingly, the host device 102 and the USB device 108 can communicate via the USB extension devices 104, 106 without any non-standard software or hardware re-configuration on the host device 102 or USB device 108.

Figure 2:
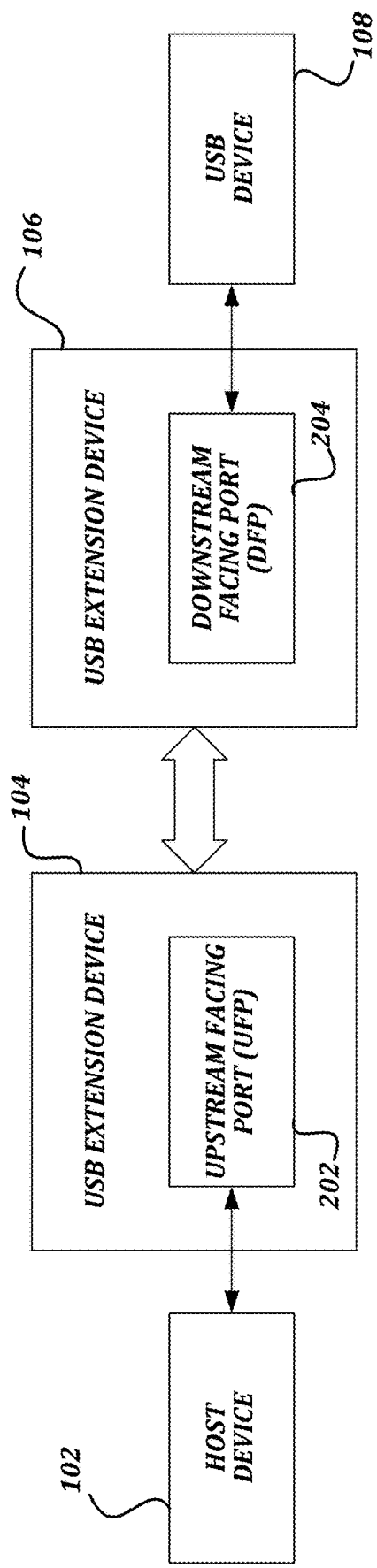
FIG. 2 is a block diagram that illustrates further details of the upstream USB extension device and downstream USB extension device illustrated in FIG. 1.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." Likewise, because the upstream USB extension device 104 includes an upstream facing port 202, the upstream USB extension device 104 may also be called a "UFP device," and because the downstream USB extension device 106 includes a downstream facing port 204, the downstream USB extension device 106 may also be called a "DFP device."

The UFP device 104 is configured at least to communicate with the host device 102 via a USB-standard-compliant protocol using the UFP 202, and to exchange messages and USB bus traffic with the DFP device 106 via the extension medium. The DFP device 106 is configured at least to communicate with the USB device 108 via a USB-standard-compliant protocol using the DFP 204, and to exchange messages and USB bus traffic with the UFP device 104 via the extension medium. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of the host device 102, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host device 102, such as a downstream facing port of a hub, and/or the like. Likewise, in other embodiments, the downstream facing port 204 of the downstream USB extension device 106 may be connected to an upstream facing port other than one provided by a USB device 108, such as an upstream facing port of a hub, and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
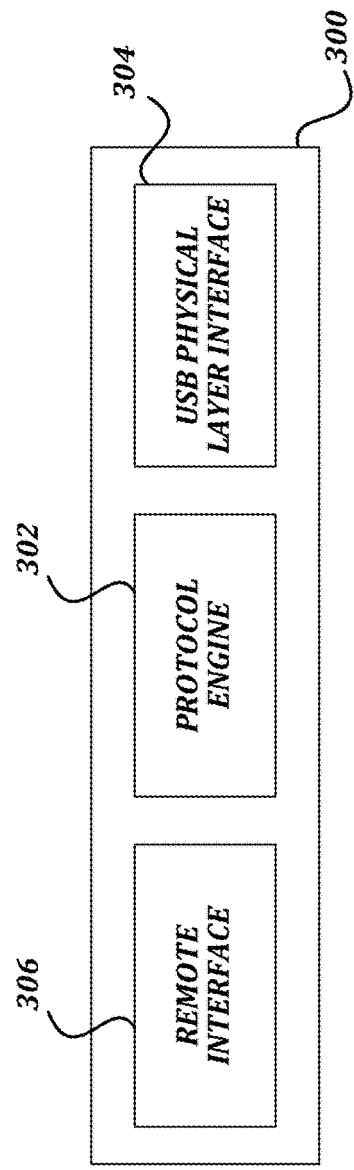
FIG. 3 is a block diagram that illustrates an exemplary embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 302, a USB physical layer interface 304, and a remote interface 306. In some embodiments, the protocol engine 302 may be configured to provide and/or execute the logic discussed below with regard to the UFP device 104 and/or the DFP device 106. The protocol engine 302 may instruct the USB physical layer interface 304 to apply the appropriate electrical signals to the USB physical layer in order to communicate with the USB device 108 or the host device 102. Likewise, the protocol engine 302 may instruct the remote interface 306 to exchange information with the remote USB extension device.

In some embodiments, the protocol engine 302 may be implemented within a logic device such as a PLD, an ASIC, a FPGA, and/or the like. In other embodiments, the protocol engine 302 may be implemented within a computing device having at least one processor and a memory containing computer-executable instructions that, if executed by the at least one processor, cause the protocol engine 302 to perform the actions discussed below; a dedicated digital hardware device implemented, for example, as a state machine configured to perform the actions described; within an application specific processor; and/or within any other suitable computing device. In some embodiments, the protocol engine 302 (or other component of the port device 300) may include a computer-readable memory usable to cache data packets, as discussed further below.

In some embodiments, logic of actions attributed to a USB extension device is executed by a protocol engine 302, which then instructs a USB physical layer interface 304 and/or a remote interface 306 to perform the appropriate communication steps associated with the logic. Throughout the discussion below, such actions may simply be described as being performed by the UFP device 104 or the DFP device 106 as if it was a single device for ease of discussion. One of ordinary skill in the art will recognize that actions attributed directly to the UFP device 104 or the DFP device 106 may actually be performed by a protocol engine 302, a USB physical layer interface 304, a remote interface 306, and/or some other component of the USB extension device.

In some embodiments, the UFP device 104 and DFP device 106 may be configured to operate in one of a plurality of modes, depending on the latency of the link between them. In a low latency mode, the UFP device 104 and DFP device 106 may be linked by a communication channel of adequate speed to support a SuperSpeed connection simply by bridging USB packets across the communication channel. In a high latency mode, the UFP device 104 and the DFP device 106 may techniques to compensate for the delay in packet transmission as discussed further below. In some embodiments, the mode may be selected by a user while configuring the UFP device 104 and the DFP device 106. In some embodiments, the UFP device 104 and the DFP device 106 may automatically determine a degree of latency between the devices and may automatically choose a mode based on that determination.

Figure 4A:
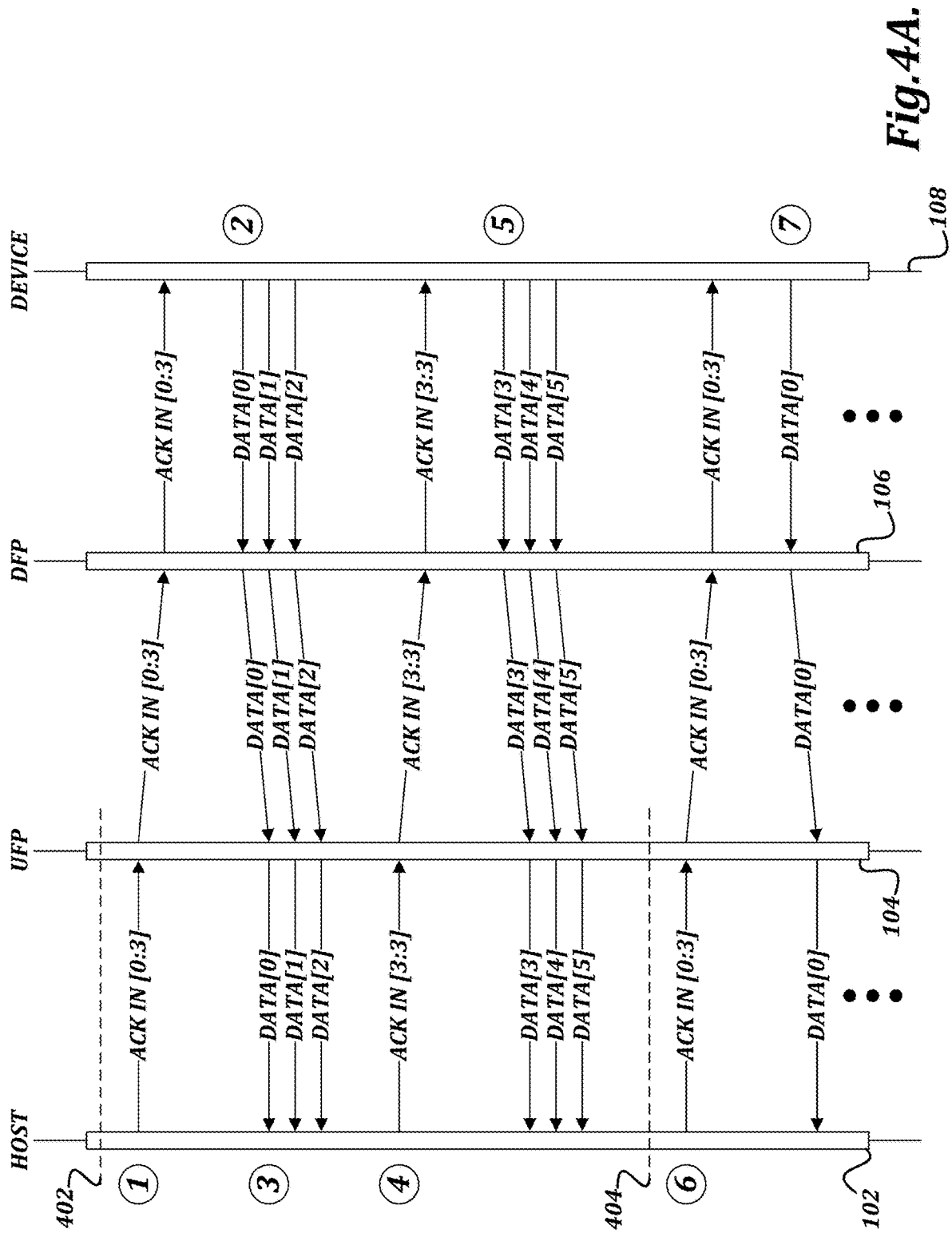
FIG. 4A is a sequence diagram that illustrates communication between a host device and a USB device in a low latency mode according to various aspects of the present disclosure.

FIG. 4A is a sequence diagram that illustrates communication between a host device 102 and a USB device 108 in a low latency mode according to various aspects of the present disclosure. The illustrated communication is an isochronous IN communication, in which the host device 102 indicates that it is ready to receive data, and the USB device 108 transmits data to the host device 102. FIG. 4A illustrates the use of a UFP device 104 and a DFP device 106, in a case wherein the latency between the UFP device 104 and the DFP device 106 is low enough that the UFP device 104 and the DFP device 106 may simply convert and bridge USB physical layer signaling onto the extension medium without timing errors being introduced. In this case, the extension medium has a throughput capable of supporting a SuperSpeed connection, such as 5.0 Gbps or 10.0 Gbps. In this low latency case, the latency between the UFP device 104, the DFP device 106, and the extension medium does not impact timing parameters between the host device 102 and the USB device 108.

In SuperSpeed communication, the host device 102 schedules service intervals of, for example, 125 µs, for isochronous transactions. As described in Section 8.12.5 of the USB 3.1 Specification, the host device 102 is required to schedule isochronous transactions such that they do not cross these service interval boundaries. In the low-latency scenario illustrated in FIG. 4A, this may not be a problem. A first service interval boundary 402 and a second service interval boundary 404 are shown. At point 1, the host device 102 generates a request packet, such as an ACK packet, and transmits it to the UFP device 104. The ACK packet indicates a sequence number ("0") and a number of packets that the host device 102 is ready to accept ("3"). The host device 102 may base the number of packets that it is ready to accept on a determination of whether all of the packets would be received before the next service interval boundary 404 occurs.

The UFP device 104 receives the ACK packet, and transmits it to the DFP device 106 via the extension medium. The DFP device 106 then transmits the ACK packet to the USB device 108. At point 2, the USB device 108 begins transmitting DATA packets, starting at the requested sequence number. The DATA packets are received by the DFP device 106, which forwards the DATA packets to the UFP device 104. At point 3, the UFP device 104 begins transmitting the DATA packets to the host device 102, which receives them.

At point 4, because the host device 102 is required to schedule the IN transaction such that it does not cross a service interval boundary, the host device 102 determines a number of data packets that could be received before the second service interval boundary 404 occurs. As shown, the host device 102 has determined, based on the timings specified in the USB specification, that three data packets could be requested and received before reaching the service interval boundary 404. Accordingly, the host device 102 transmits another request packet, such as an ACK packet, that indicates the next sequence number ("3") and the number of packets ("3") that it had determined could be received before the service interval boundary 404. As before, the ACK packet is received by the UFP device 104, transmitted to the DFP device 106 over the extension medium, and then received by the USB device 108. At point 5, the USB device 108 transmits the requested data packets to the DFP device 106. The DFP device 106 transmits the requested data packets to the UFP device 104, which, in turn, transmits the requested data packets to the host device 102. After the second service interval boundary 404, the same process occurs again: at point 6, the host device 102 transmits a request packet to the USB device 108 via the UFP device 104 and the DFP device 106, and at point 7 the USB device 108 begins transmitting responsive data packets.

One will note that the transmission of two sets of three packets is an example only, and that in some embodiments, different numbers of packets may be requested. For example, Section 8.12.6.2 of the USB 3.1 Specification indicates that a host may split a transfer into bursts of 2, 4, or 8 data packets, followed by a burst of however many packets are remaining to be requested. Accordingly, in some embodiments, to request six data packets during a service interval the host 102 may request four data packets at point 1, and then two data packets at point 4. In practice, it has been found that host devices 102 exhibit a variety of behavior.

Figure 4B:
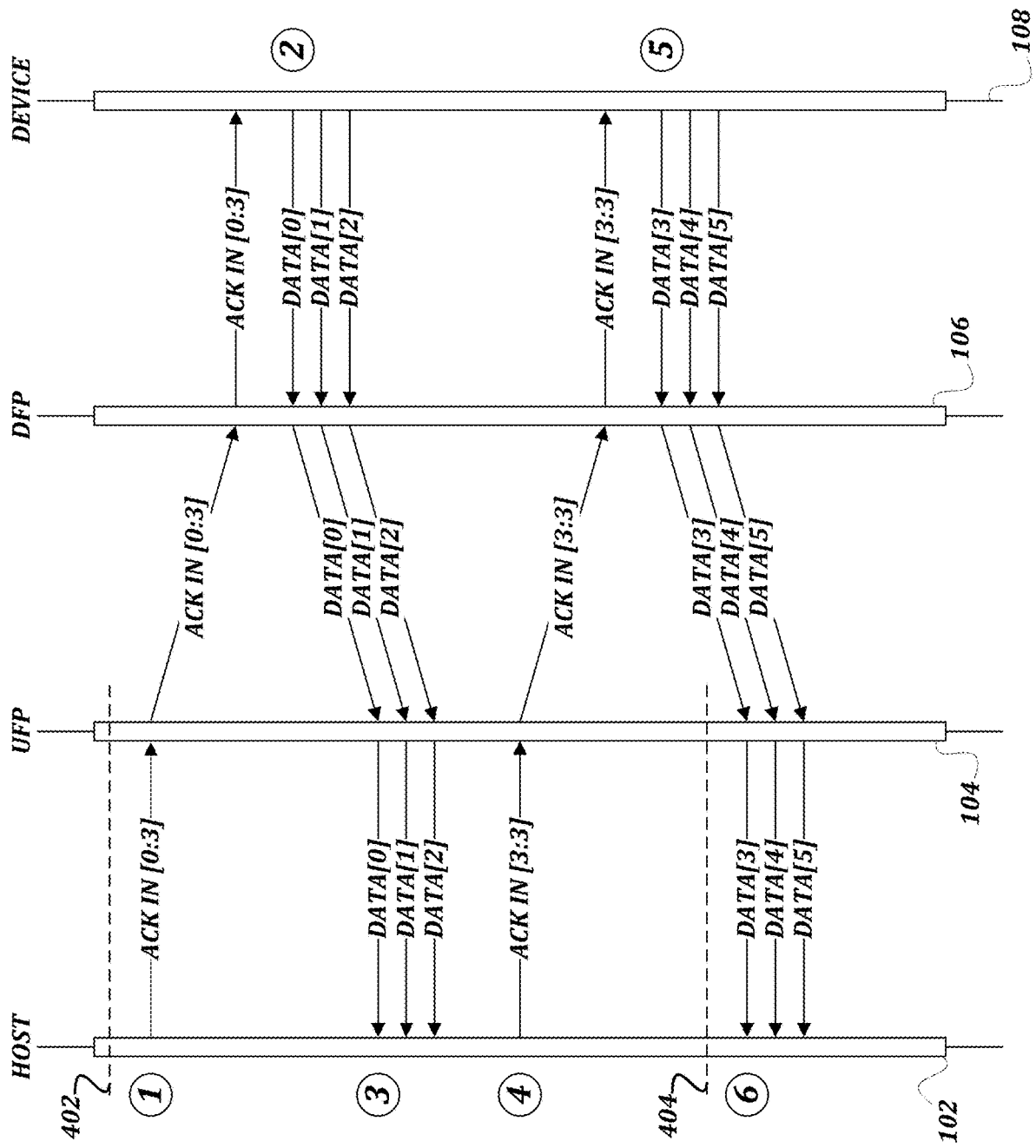
FIG. 4B is a sequence diagram that illustrates a problem in using the naïve bridging technique for isochronous IN transactions in high latency situations.

While the technique shown in FIG. 4A works in the trivial, low latency case, the inventors of the present disclosure have discovered that problems arise in high latency situations. FIG. 4B is a sequence diagram that illustrates a problem in using the naïve bridging technique for isochronous IN transactions in high latency situations. A first service interval boundary 402 and a second service interval boundary 404 are again shown. As in FIG. 4A, at point 1, the host device 102 transmits a request packet to request three data packets, which is transmitted to the USB device 108 via the UFP device 104 and the DFP device 106. At point 2, the USB device 108 begins transmitting the requested data packets back to the host device 102 via the DFP device 106 and the UFP device 104, and at point 3, the host device 102 begins receiving the data packets.

At point 4, the problems begin to become clear. As stated above, the presence of the extension medium is hidden from the host device 102, and so the host device 102 does not have the information needed to compensate for the added latency. When the host device 102 determines how many packets it can request and receive before the second service interval boundary 404 occurs, it uses the timings indicated in the USB specification to do so. Accordingly, at point 4, the host device 102 determines that, based on specification-compliant timings, it could receive three data packets before the second service interval boundary 404. So, the host device 102 transmits a request packet requesting three data packets.

The request packet is transmitted to the USB device 108 via the UFP device 104 and the DFP device 106, and at point 5, the USB device 108 begins transmitting the requested data packets to the host device 102 via the DFP device 106 and the UFP device 104. Due to the added latency introduced by the extension medium, the host device 102 does not start receiving the data packets until point 6, which is after the second service interval boundary 404 has already occurred. This will cause errors in the communication between the host device 102 and the USB device 108. In some cases, these errors may manifest as the connection between the host device 102 and the USB device 108 being dropped. In some cases, the connection may not be dropped, but the errors may manifest in other ways, such as a video image provided by a camera including flicker or other unwanted artifacts.

Figure 5A:
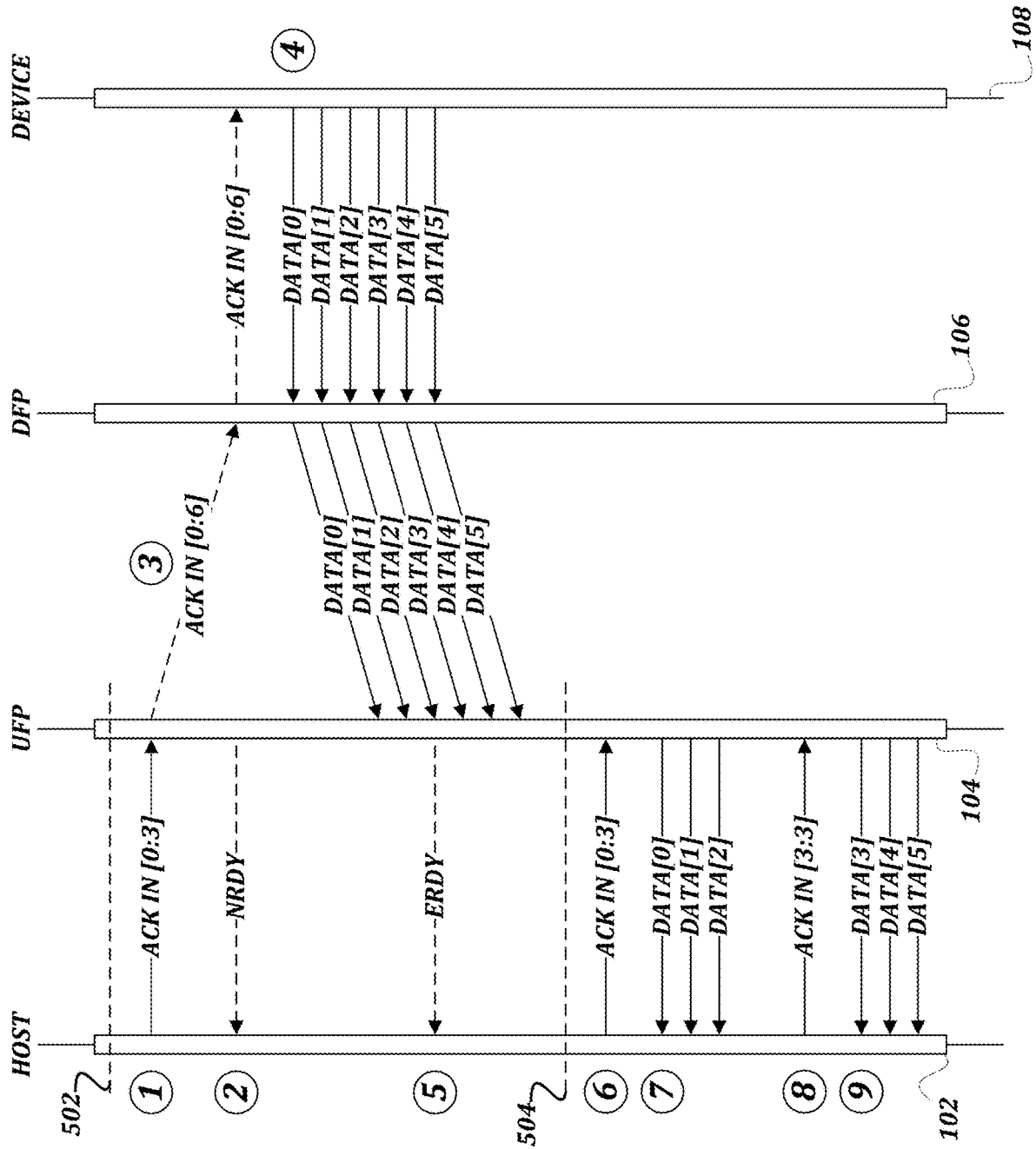
FIG. 5A is a sequence diagram that illustrates an example of a first technique for compensating for latency added by the extension medium in isochronous IN transactions according to various aspects of the present disclosure.

FIG. 5A is a sequence diagram that illustrates an example of a first technique for compensating for latency added by the extension medium in isochronous IN transactions according to various aspects of the present disclosure. Like in FIGS. 4A and 4B, a first service interval boundary 502 and a second service interval boundary 504 are illustrated. At point 1, the host device 102 sends a request packet to the UFP device 104 that includes a sequence number ("0") and a number of packets ("3"). At point 2, the UFP device 104 transmits a synthetic packet back to the host device 102 to place the host device 102 in a temporary waiting state. The illustrated synthetic packet is a not ready (NRDY) packet, as described in the USB specification, but any other type of packet that can place the host device 102 in a waiting state may be used. In response to receiving the NRDY packet, the host device 102 enters a waiting state in which it does not transmit further request packets until after receiving a packet to remove it from the waiting state, as discussed below.

At point 3, the UFP device 104 sends a synthetic request packet to the DFP device 106. The synthetic request packet created by the UFP device 104 includes the sequence number from the request packet transmitted by the host device 102 at point 1. However, the UFP device 104 has altered the number of packets such that it does not match the number of packets in the request packet transmitted by the host device 102 at point 1.

In some embodiments, the UFP device 104 may request a greater number of packets than were requested by the host device 102. Requesting a greater number of packets allows the UFP device 104 to receive and cache data to respond to subsequent requests from the host device 102. In some embodiments, the UFP device 104 may determine a number of packets associated with a maximum burst size that has been configured by the host device 102 for the USB topology during the initial enumeration conducted by the host device 102. Some typical maximum burst sizes may be up to 48 for 5 Gbps communication or 96 for 10 Gbps communication. In such an embodiment, the UFP device 104 may then request a number of packets to correspond to the maximum burst size, regardless of whether the host device 102 requested fewer packets in its first request. This may ensure that the UFP device 104 will have all of the data that the host device 102 would request during a single service interval. In other embodiments, the UFP device 104 may request any number of packets that is between the number of packets requested by the host device 102 and the maximum burst size. As illustrated, the UFP device 104 has generated a synthetic packet to request six packets, instead of the three originally requested by the host device 102. This may be because the maximum burst size has been configured to be six, or for other reasons including but not limited to a configuration on the UFP device 104, a determination based on the number of packets from the original request packet, or a determination based on the amount of latency between the UFP device 104 and the DFP device 106. The DFP device 106 receives the synthetic request packet, and at point 4, transmits the requested data packets to the DFP device 106. The DFP device 106 then transmits the requested data packets to the UFP device 104.

At point 5, the UFP device 104 transmits another synthetic packet to remove the host device 102 from the waiting state. As illustrated, a synthetic ready (ERDY) packet is transmitted, but any other suitable packet for removing the host device 102 from the waiting state may be used. In the illustrated embodiment, the UFP device 104 transmits the ERDY packet once it has received the originally requested number of data packets (three, in the illustrated embodiment). In some embodiments, the UFP device 104 may not transmit the ERDY packet until it has received all of the data packets it requested at point 3. In some embodiments, the UFP device 104 may not transmit the ERDY packet until after the second service interval boundary 504, or until after one or more subsequent service interval boundaries have passed.

After receiving the ERDY packet, the host device 102 determines when to re-transmit its request packet. In some embodiments, the host device 102 may determine whether enough time remains before the next service interval boundary 504 to receive the requested packets. In such embodiments, the host device 102 may transmit a subsequent request packet immediately upon determining that enough time remains. In some embodiments, the host device 102 may wait until after the next service interval boundary 504 before transmitting the subsequent request packet, regardless of how much time is remaining in the service interval.

As illustrated, the host device 102 has determined that it should wait until after the second service interval boundary 504, and then, at point 6, the host device 102 transmits a new request packet that is similar to the request packet transmitted at point 1. At point 7, the UFP device 104 responds with the three data packets that had been cached on the UFP device 104. At point 8, the host device 102 transmits another request packet to request the next three data packets, and at point 9, the UFP device 104 responds with the next three data packets that had also been cached on the UFP device 104. One will note that, by pre-fetching more data than requested by the host device 102, the UFP device 104 is able to replicate the functionality described between points 1-5 of FIG. 4A, wherein a maximum amount of data can be transferred during a single service interval, even though the situation in FIG. 5A includes a high amount of latency between the UFP device 104 and the DFP device 106.

FIG. 5B is a sequence diagram that illustrates an example of a second technique for compensating for latency added by the extension medium in isochronous IN transactions according to various aspects of the present disclosure. The embodiment illustrated in FIG. 5B is highly similar to the embodiment illustrated in FIG. 5A. For example, a first service interval boundary 502 and a second service interval boundary 504 are present, and at point 1, the host device 102 transmits a request packet to the UFP device 104. Instead of replying to the host device 102 at point 2 with a synthetic packet that places the host device 102 in a waiting state as occurred in FIG. 5A, in FIG. 5B the UFP device 104 replies to the host device 102 at point 2 with a synthetic data packet with a payload of zero length. This causes the host device 102 to believe that the USB device 108 does not have any data to transmit in response to the request packet. Meanwhile, at point 3, the UFP device 104 transmits a synthetic request packet as described above with respect to FIG. 5A, and at point 4, the USB device 108 transmits data packets in response to the synthetic request packet as also described above.

In response to the zero length data packet, the host device 102 does not transmit another request packet until after the second service boundary interval 504. Then, at point 5, the host device 102 transmits a subsequent request packet, and at point 6, the UFP device 104 replies with the cached data packets, proceeding in a similar manner to points 6, 7, and the subsequent points of FIG. 5A. In some embodiments, the UFP device 104 may transmit another zero length packet to the request packet transmitted at point 5, if, for example, the UFP device 104 has not yet received enough data to fully respond to the request packet, or if the UFP device 104 has not yet received all of the data it requested in its synthetic request packet from point 3. In such a case, the host device 102 may wait again until a subsequent service interval before transmitting another request packet.

Figure 6A:
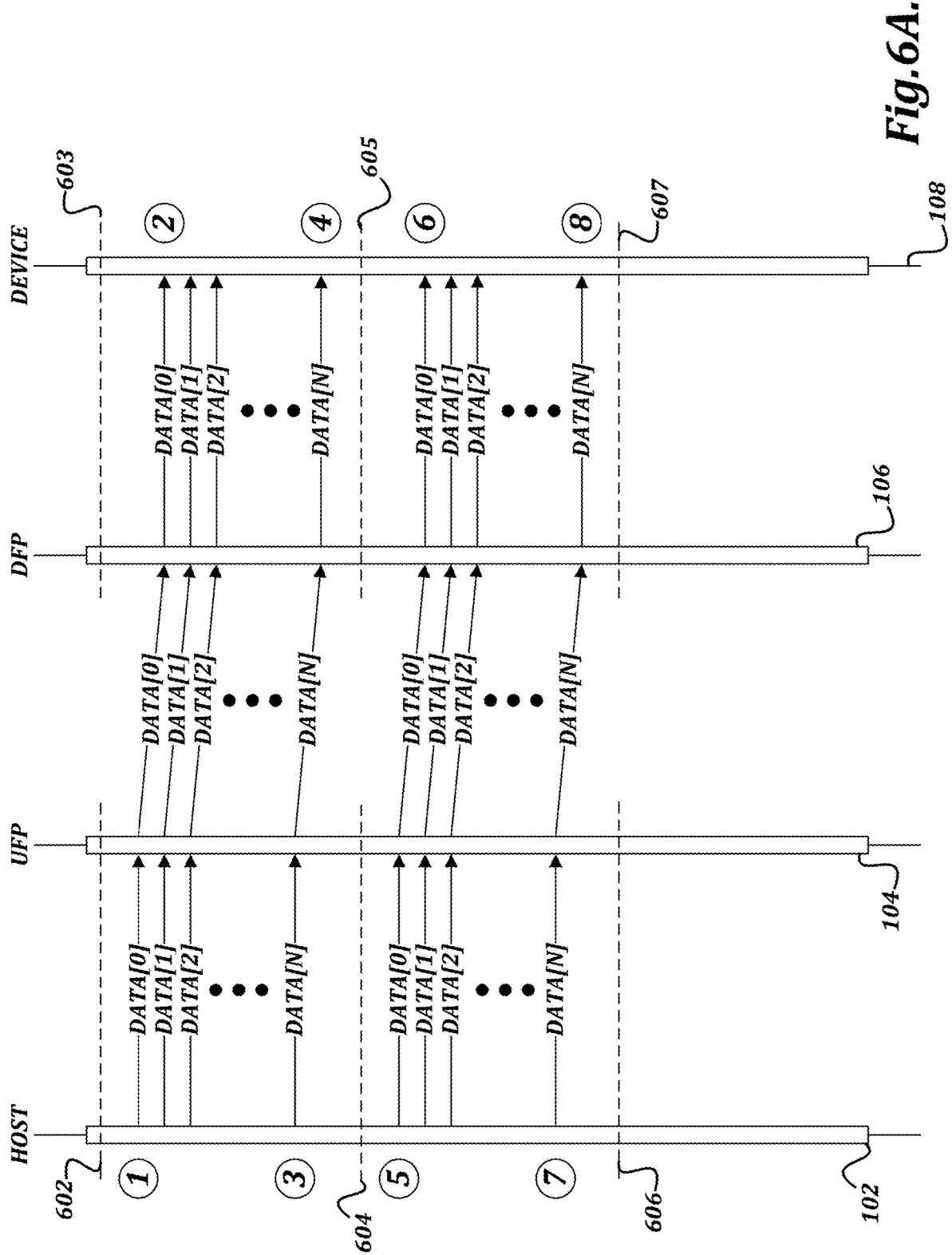
FIG. 6A is a sequence diagram that illustrates communication between a host device and a USB device in a low latency mode according to various aspects of the present disclosure.

FIG. 6A is a sequence diagram that illustrates communication between a host device 102 and a USB device 108 in a low latency mode according to various aspects of the present disclosure. The illustrated communication is an isochronous OUT communication, in which the host device 102 transmits data to the USB device 108. As in FIG. 4A, FIG. 6A illustrates the use of a UFP device 104 and a DFP device 106 in a case where the latency between the UFP device 104 and the DFP device 106 is low enough that the UFP device 104 and the DFP device 106 may simply convert and bridge USB physical layer signaling onto the extension medium without timing errors being introduced.

As illustrated, the host device 102 establishes a first service interval boundary 602, a second service interval boundary 604, and a third service interval boundary 606. Service interval boundaries are typically synchronized within the USB topology, and so, upon receiving the appropriate signals bridged from the UFP device 104, the DFP device 106 creates its own first bridged service interval boundary 603, second bridged service interval boundary 605, and third bridged service interval boundary 607 that occur at substantially the same time as the service interval boundaries generated by the host device 102.

As mentioned above, the host device 102 is required to schedule isochronous transactions such that they do not cross service interval boundaries. In the low latency case illustrated in FIG. 6A, this is not a problem. At point 1, the host device 102 begins transmitting data packets, which are received by the UFP device 104, bridged over the extension medium to the DFP device 106, and then transmitted to the USB device 108, which receives the data packets starting at point 2. The host device 102 continues to send data packets for the transaction, up to and including a last data packet at point 3. The last data packet in the transaction, which has its LPF field set to 1 instead of 0, is transmitted to the USB device 108 via the UFP device 104 and the DFP device 106, and is received by the USB device 108 at point 4, before the second bridged service interval boundary 605.

In the next service interval, the host device 102 may repeat similar actions. At point 5, after the second service interval boundary 604, the host device 102 again starts transmitting data packets, starting over at sequence 0 for each new service interval. At point 6, the USB device 108 receives the first data packet. At point 7, the host device 102 transmits the last data packet for the service interval, and at point 8, the last data packet is received by the USB device 108. Because the latency between the UFP device 104 and the DFP device 106 is low, the last data packet is both transmitted and received within the same service interval.

FIG. 6B is a sequence diagram that illustrates a problem in using the naïve bridging technique for isochronous OUT transactions in high latency situations. As with FIG. 6A, a first service interval boundary 602 established by the host device 102 is synchronized with a first bridged service interval boundary 603, and a second service interval boundary 604 established by the host device 102 is synchronized with a second bridged service interval boundary 605. As above, the host device 102 begins transmitting data packets at point 1, which are received by the USB device 108 starting at point 2. Because the host device 102 is unaware of the non-standard latency between the UFP device 104 and the DFP device 106, the host device 102 continues transmitting data packets until point 3, because the host device 102 assumes that the last data packet will be received during the same service interval. However, due to the increased latency, the USB device 108 does not receive the last data packet until point 4. Point 4 is after the second bridged service interval boundary 605, thus causing the requirements of the USB specification to be violated and errors to occur.

Figure 7A:
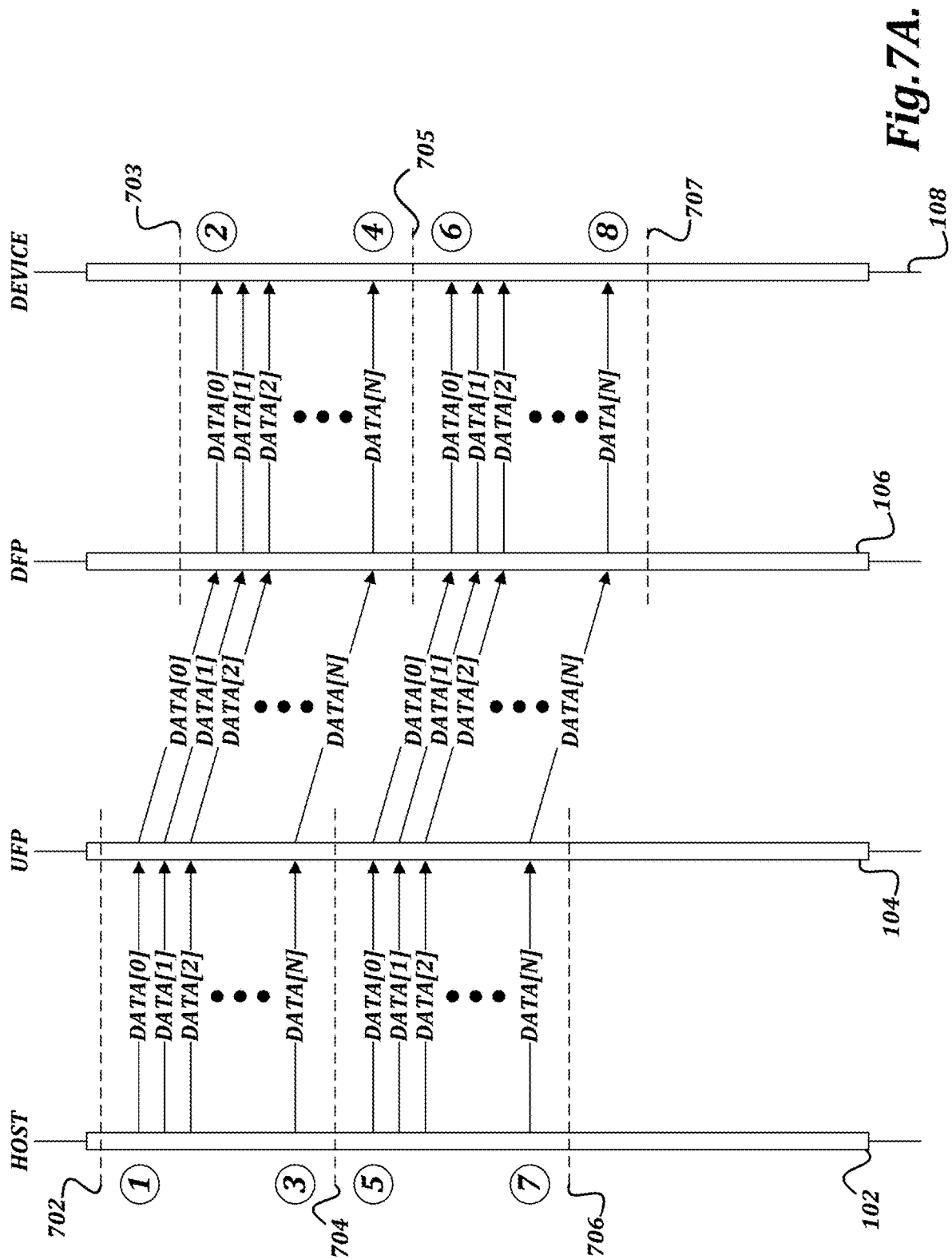
FIG. 7A is a sequence diagram that illustrates an example of a first technique for compensating for latency added by the extension medium in isochronous OUT transactions according to various aspects of the present disclosure.

FIG. 7A is a sequence diagram that illustrates an example of a first technique for compensating for latency added by the extension medium in isochronous OUT transactions according to various aspects of the present disclosure. As above, the host device 102 establishes a first service interval boundary 702, a second service interval boundary 704, and a third service interval boundary 706. However, unlike in FIG. 6A, the service interval boundaries are not synchronized in time between the host device 102 and the DFP device 106. Instead, the DFP device 106 has established its own first synthetic service interval boundary 703, second synthetic service interval boundary 705, and third synthetic service interval boundary 707. In some embodiments, the DFP device 106 may delay the synthetic service interval boundaries based on a measured amount of latency between the UFP device 104 and the DFP device 106.

By creating the synthetic service interval boundaries, the DFP device 106 can compensate for the latency of the extension medium and thereby ensure that the information transmitted by the host device 102 during a single service interval can be received by the USB device 108 within a single service interval. As shown, the host device 102 begins transmitting data packets at point 1, and the USB device 108 begins receiving the data packets, after having been transmitted from the UFP device 104 to the DFP device 106 via the extension medium, at point 2. The host device 102 transmits the last data packet of the transaction at point 3. The USB device 108 receives the last data packet from the DFP device 106 at point 4. Though point 4 occurs after the second service interval boundary 704, it occurs before the second synthetic service interval boundary 705 generated by the DFP device 106, and so does not cause an error to occur.

A subsequent service interval may be handled in a similar fashion: at point 5, the host device 102 begins transmitting data packets, which the USB device 108 begins to receive at point 6. The last data packet is transmitted by the host device 102 at point 7, and is received by the USB device 108 at point 8 (after the third service interval boundary 706, but before the third synthetic service interval boundary 707).

FIG. 7B is a sequence diagram that illustrates an example of a second technique for compensating for latency added by the extension medium in isochronous OUT transactions according to various aspects of the present disclosure. Again, the host device 102 establishes a first service interval boundary 752, a second service interval boundary 754, and a third service interval boundary 756. Unlike FIG. 7A, a first synchronized service interval boundary 753, a second synchronized service interval boundary 755, and a third synchronized service interval boundary 757 are created by the DFP device 106 that are synchronized in time with the service interval boundaries created by the host device 102. At point 1, the host device 102 begins transmitting data packets. At point 2, the DFP device 106 begins receiving the data packets transmitted by the host device 102 via the UFP device 104 and the extension medium. Because the DFP device 106 does not know whether the host device 102 will transmit more data then could be sent to the USB device 108 before the second synchronized service interval boundary 755, the DFP device 106 begins caching the data packets received from the UFP device 104. At point 3, the host device 102 transmits the last data packet of the transaction, and at point 4, the last data packet is received and cached by the DFP device 106. In some embodiments, once the last data packet is received by the DFP device 106, the DFP device 106 can determine whether all of the cached data packets can be transmitted to the USB device 108 within the current service interval. If the DFP device 106 determines that the cached data packets can all be transmitted during the current service interval (such as illustrated in FIG. 7B at point 4), then the DFP device 106 begins transmitting the cached data packets to the USB device 108, ending with the last cached data packet at point 5. As shown, because the DFP device 106 waited until after the second synchronized service interval boundary 755 to begin transmitting the cached data packets, all of the cached data packets could be transmitted before the third synchronized service interval boundary 757. In some embodiments, the DFP device 106 may begin transmitting the cached data packets upon the occurrence of the second synchronized service interval boundary 755 regardless of whether all of the data packets of the transaction have been received by the DFP device 106. Such an embodiment may be useful in cases wherein the latency is guaranteed to be less than the service interval time, because delaying the transmission of the cached data by a single service interval will be adequate to compensate for the latency.

At point 6, the host device 102 begins transmitting data packets for a subsequent transaction. At point 7, the DFP device 106 begins caching the data packets for the subsequent transaction, even while transmitting the data packets from the previous transaction to the USB device 108. Thereafter, the host device 102, UFP device 104, DFP device 106, and USB device 108 continue to proceed in the same way until the host device 102 is done transmitting data packets.

Figure 8A:
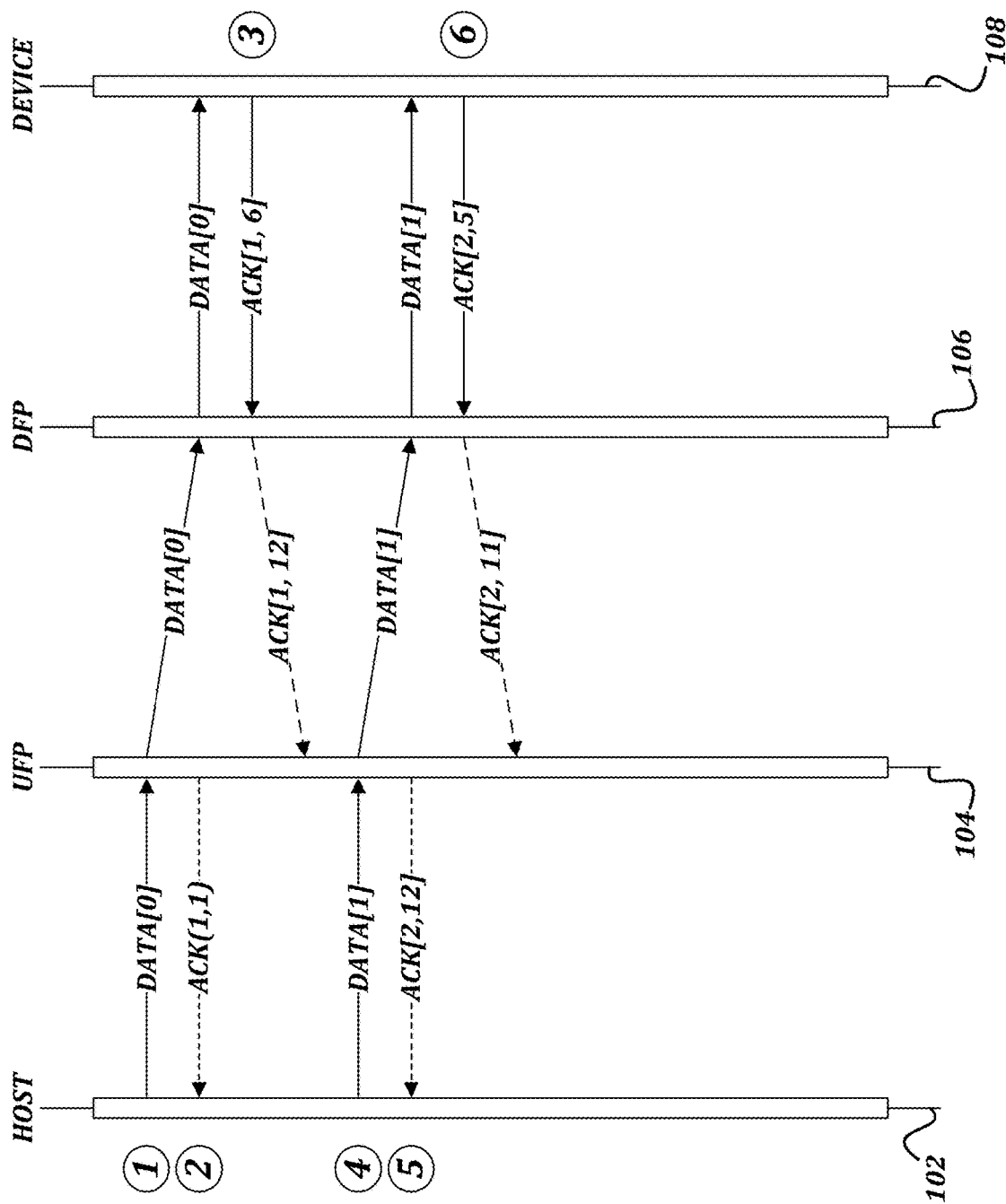
FIG. 8A is a sequence diagram that illustrates an example embodiment of an improved bulk OUT transaction according to various aspects of the present disclosure.

In some embodiments of the present disclosure, the altering of packet counts may be used to enhance bulk transactions as well as the isochronous transactions described above. FIG. 8A is a sequence diagram that illustrates an example embodiment of an improved bulk OUT transaction according to various aspects of the present disclosure. At point 1, the host transmits a first data packet to the UFP device 104, which is then transmitted via the extension medium to the DFP device 106, and then to the USB device 108. To ensure that the link between the host device 102 and the UFP device 104 remains active regardless of the latency on the extension medium, at point 2 the UFP device 104 generates a synthetic ACK packet to acknowledge the data packet transmitted by the host device 102. The sequence number in the ACK packet implicitly indicates that the packet was received by requesting a subsequent packet, and the packet count indicates an amount of available buffer space. At point 2, the UFP device 104 does not know how much buffer space is available on either the DFP device 106 or the USB device 108, and so it replies with a minimum number ("1") to keep the connection alive.

At point 3, the USB device 108 replies to the data packet per the USB specification by transmitting an ACK packet to acknowledge receipt by requesting the next packet in the sequence, and by indicating an amount of available buffer space on the USB device 108 ("6"). The DFP device 106 receives the acknowledgement packet from the USB device 108. Instead of merely transmitting the received acknowledgement packet, the DFP device 106 determines an amount of buffer space available on the DFP device 106 (instead of as indicated in the acknowledgement packet), and creates a synthetic acknowledgement packet for transmission to the UFP device 104. This allows the DFP device 106 to request more data than usable by the USB device 108, which may then be pre-fetched and cached by the DFP device 106. The DFP device 106 may then provide the cached data to the USB device 108 without having to further compensate for the latency of the extension medium.

At point 4, the host device 102 transmits a second data packet to the UFP device 104, which is transmitted to the DFP device 106 and then to the USB device 108. At point 5, the UFP device 104 responds with a synthetic ACK packet, but this time instead of using the default minimum buffer space, the UFP device 104 indicates the amount of buffer space that was reported by the DFP device 106 in its synthetic ACK packet. At point 6, the USB device 108 responds with a standard-compliant acknowledgement packet, which is then used as a basis for another synthetic acknowledgement packet by the DFP device 106. The communication may then continue on in a similar manner as long as the host device 102 continues to transmit data packets.

Figure 8B:
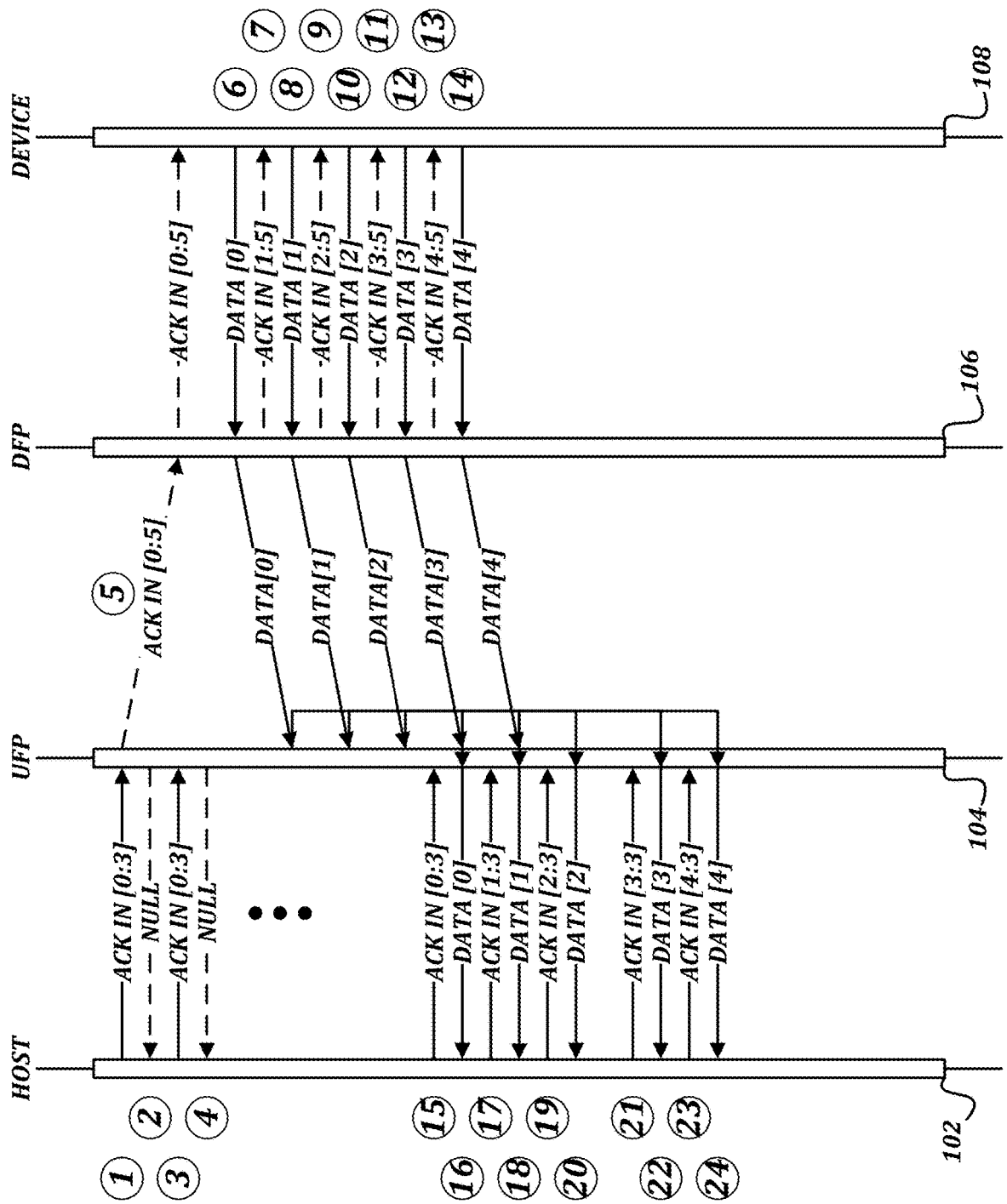
FIG. 8B is a sequence diagram that illustrates an example embodiment of an improved bulk IN transaction according to various aspects of the present disclosure.

FIG. 8B is a sequence diagram that illustrates an example embodiment of an improved bulk IN transaction according to various aspects of the present disclosure. At point 1, the host device 102 transmits an ACK IN packet that includes a sequence number ("0") and a number of packets ("3") to be requested. At point 2, the UFP device 104 responds with a synthetic NULL packet, an otherwise valid data packet with a zero length payload, to indicate to the host device 102 that it does not yet have any data to provide. At point 3, the host device 102 may retry the request packet, but unless the UFP device 104 has received the data packets from the DFP device 106, it responds at point 4 with another synthetic NULL packet.

At point 5, the UFP device 104 generates a synthetic ACK IN packet based on the ACK IN packet received from the host device 102 and an available amount of buffer space on the UFP device 104. By doing so, the UFP device 104 can request more data than was requested by the host device 102, and can pre-fetch and cache the additional data so that subsequent requests from the host device 102 can be handled by the UFP device 104 more efficiently. As illustrated, the synthetic ACK IN packet generated by the UFP device 104 has requested five packets instead of the three packets requested by the host device 102, but greater or fewer than five packets may be requested in the synthetic ACK IN packet.

The synthetic ACK IN packet is received by the DPF device 106, and is transmitted to the USB device 108. At point 6, the USB device 108 replies with the first requested data packet, and the DFP device 106 transmits the first requested data packet to the UFP device 104. Upon receiving the first requested data packet, the UFP device 104 caches the first requested data packet for later delivery to the host device 102. At point 7, the DFP device 106 acknowledges the first data packet with a second synthetic ACK IN packet that requests the second data packet. At point 8, the USB device 108 replies with the second requested data packet, which is again transmitted by the DFP device 106 to the UFP device 108 to be cached. This process is repeated at points 9 and 10 for the third requested data packet, at points 11 and 12 for the fourth requested data packet, and at points 13 and 14 for the fifth requested data packet.

At point 15, the host device 102 again transmits a request packet to the UFP device 104. At point 16, the UFP device 104 has received enough data packets to fulfill the request transmitted by the host device 102, and so the UFP device 104 transmits the first requested data packet from its cache to the host device 102. At point 17, the host device 102 acknowledges the first requested data packet by requesting the second data packet, and at point 18 the UFP device 104 transmits the second requested data packet from its cache to the host device 102. This process is repeated at points 19 and 20 for the third requested data packet.

At point 21, the host device 102 requests the fourth data packet. If the UFP device 104 had not increased the buffer size to be requested from the USB device 108, then the UFP device 104 would not yet have the fourth data packet, and would have to respond with a NULL packet (or other type of packet) as at points 2 or 4 until the request could be fulfilled by the DFP device. However, because the UFP device 104 pre-cached additional data packets, the UFP device 104 can respond at point 22 with the cached fourth data packet without having to transmit a request to the DFP device 106. The same is true at points 23 and 24 for the fifth data packet.

In some embodiments, the UFP device 104 may continue to pre-fetch and cache data packets in anticipation of future requests by the host device 102. For example, though not illustrated, the UFP device 104 may, at point 21 (or some other point after point 16), transmit another synthetic ACK IN packet to the DFP device 106 in order to attempt to keep its cache full regardless of the ACK IN packets received from the host device 102.

While illustrative embodiments have been illustrated and described, it will be appreciated that various changes can be made therein without departing from the spirit and scope of the invention.

The embodiments of the invention in which an exclusive property or privilege is claimed are defined as follows:

1. An upstream facing port device (UFP device), comprising:
    a USB upstream facing port; and
    an extension interface configured to be coupled to a non-USB extension medium;
    wherein the UFP device is configured to allow a host device coupled to the USB upstream facing port via a USB-compliant connection to communicate via the extension medium with a USB device coupled to a downstream facing port device (DFP device), by performing actions comprising:
    receiving, by the UFP device, a request packet from the host device via the USB upstream facing port, wherein the request packet includes a sequence number and a buffer count, and wherein the sequence number and the buffer count identify a first set of requested data packets;
    generating, by the UFP device, a synthetic request packet, wherein the synthetic request packet includes the sequence number of the request packet and a synthetic buffer count, and wherein the sequence number and the synthetic buffer count identify a second set of requested data packets that includes the first set of requested data packets and additional data packets;
    transmitting, by the UFP device, the synthetic request packet to the DFP device via the extension medium;
    transmitting, by the UFP device, a synthetic response packet to the host device to cause the host device to wait for the first set of requested data packets;
    receiving, by the UFP device, data packets from the DFP device; and
    storing, by the UFP device, the received data packets until requested by the host device.

2. The UFP device of claim 1, wherein the synthetic response packet is a not ready (NRDY) packet, and wherein the actions further comprise:
    transmitting, by the UFP device, a ready (ERDY) packet to the host device to cause the host device to transmit another request packet to the UFP device that identifies the first set of requested data packets.

3. The UFP device of claim 2, wherein the ERDY packet is transmitted to the host device in response to determining that all of the first set of requested data packets have been received.

4. The UFP device of claim 2, wherein the ERDY packet is transmitted to the host device in response to determining that all of the second set of requested data packets have been received.

5. The UFP device of claim 1, wherein the synthetic response packet is a zero-length packet, and wherein the actions further comprise:
    receiving, by the UFP device, another request packet that identifies the first set of requested data packets from the host device in a subsequent service interval;
    in response to determining that the first set of requested data packets have been received, transmitting, by the UFP device, the first set of requested data packets to the host device; and
    in response to determining that the first set of requested data packets have not been received, transmitting, by the UFP device, another zero-length packet to the host device.

6. A downstream facing port device (DFP device), comprising:
    a USB downstream facing port; and
    an extension interface configured to be coupled to a non-USB extension medium;
    wherein the DFP device is configured to allow a USB device coupled to the USB downstream facing port via a USB-compliant connection to communicate via the extension medium with a host device coupled to an upstream facing port device (UFP device), by performing actions comprising:
    generating, by the DFP device, service interval boundaries at a first timing that is offset from a second timing of service interval boundaries generated by the host device;
    receiving, by the DFP device, a set of data packets from the UFP device that were generated by the host device during a first service interval defined between a first service interval boundary generated by the host device and a second service interval boundary generated by the host device; and
    transmitting, by the DFP device, the set of data packets to the USB device during a second service interval that corresponds to the first service interval, wherein the second service interval is defined between a third service interval boundary generated by the DFP device and a fourth service interval boundary generated by the DFP device.

7. The DFP device of claim 6, wherein the offset is based on an amount of latency between the UFP device and the DFP device.

8. The DFP device of claim 6, wherein the second service interval overlaps partially with the first service interval.

9. The DFP device of claim 6, wherein the set of data packets begins with a first data packet, and wherein the DFP device begins transmitting the set of data packets to the USB device once the first data packet is received.

10. A downstream facing port device (DFP device), comprising:
   a USB downstream facing port; and
   an extension interface configured to be coupled to a non-USB extension medium;
   wherein the DFP device is configured to allow a USB device coupled to the USB downstream facing port via a USB-compliant connection to communicate via the extension medium with a host device coupled to an upstream facing port device (UFP device), by performing actions comprising:
   generating, by the DFP device, service interval boundaries that are synchronized with service interval boundaries generated by the host device;
   receiving, by the DFP device, a set of data packets from the UFP device that were generated by the host device during a first service interval defined between a first service interval boundary generated by the host device and a second service interval boundary generated by the host device;
   storing, by the DFP device, the set of data packets; and
   transmitting, by the DFP device, the set of data packets to the USB device in a second service interval that occurs after the first service interval, wherein the second service interval is defined between a third service interval boundary generated by the DFP device and a fourth service interval boundary generated by the DFP device, and wherein the third service interval boundary occurs after the first service interval boundary.

11. The DFP device of claim 10, wherein the third service interval boundary is aligned with the second service interval boundary.

12. The DFP device of claim 10, wherein the third service interval boundary is after the second service interval boundary.

13. The DFP device of claim 10, wherein the DFP device begins transmitting the set of data packets at the start of the second service interval.

14. The DFP device of claim 10, wherein the DFP device begins transmitting the set of data packets to the USB device in a service interval that starts after the DFP device has received all of the data packets of the set of data packets.

* * * * *